United States Patent [19]

Tokano

[11] Patent Number: 5,838,577
[45] Date of Patent: Nov. 17, 1998

[54] ELECTRICAL APPARATUS CAPABLE OF BEING CONNECTED TO PLURAL KINDS OF PERIPHERAL DEVICES

[75] Inventor: Kaneyoshi Tokano, Tokyo, Japan

[73] Assignee: Canon Kabushiki Kaisha, Tokyo, Japan

[21] Appl. No.: 347,869

[22] Filed: Dec. 1, 1994

[30] Foreign Application Priority Data

Dec. 22, 1993 [JP] Japan .................................. 5-323771

[51] Int. Cl.$^6$ .......................... G11B 33/10; H04N 5/907
[52] U.S. Cl. ........................ 364/483; 307/130; 358/906; 396/279
[58] Field of Search .................................. 364/148, 481, 364/483, 492, 550, 707; 307/11, 38, 66, 39, 116, 126, 130, 150, 155; 358/906; 395/750; 396/277, 279

[56] References Cited

U.S. PATENT DOCUMENTS

| | | | |
|---|---|---|---|
| 4,857,756 | 8/1989 | Haneda ..................................... | 307/66 |
| 4,907,183 | 3/1990 | Tanaka ..................................... | 364/707 |
| 5,067,029 | 11/1991 | Takahashi ........................... | 358/906 X |
| 5,274,457 | 12/1993 | Kobayashi et al. ................. | 358/906 X |
| 5,423,045 | 6/1995 | Kannan et al. .......................... | 395/750 |

*Primary Examiner*—James P. Trammell
*Assistant Examiner*—Edward J. Pipala
*Attorney, Agent, or Firm*—Morgan & Finnegan, L.L.P.

[57] ABSTRACT

A recording apparatus capable of being connected to plural kinds of recording devices alternatively, comprising: connecting unit for connecting the plural kinds of recording devices alternatively; battery for supplying electrical energy to the connected recording device via the connecting unit; memory unit for storing a plurality of minimum potential values each of which is necessary for operating each of the plurality of recording devices; comparing unit for comparing the potential of the battery to be provided against each of the plurality of minimum potential values; and notification unit for notifying usable recording device or devices for recording out of the plural kinds of recording devices or devices on the basis of a comparison result by the comparing unit.

13 Claims, 13 Drawing Sheets

ELECTRICAL APPARATUS CAPABLE OF BEING CONNECTED TO PLURAL KINDS OF PERIPHERAL DEVICES

BACKGROUND OF THE INVENTION

The present invention relates to an electrical apparatus and, more particularly, to an electrical apparatus capable of being connected to plural kinds of peripheral devices.

Conventionally, there are recording apparatus capable of being connected to plural kinds of recording device and also capable of selecting recording device where an image is to be recorded. A configurations of a still video camera capable of being connected to plural kinds of recording devices are shown in FIGS. 1, 2, and 3, which will be described below. Note that FIG. 1 is a configuration of a still video camera when hard disk drive (HDD) is connected, FIG. 2 is a configuration when a solid state memory pack is connected, and FIG. 3 is a configuration when no recording device is connected.

In the figures, reference numeral 1 denotes an image pickup unit having optical elements and converting a picked-up image into electrical image signals; 2, a signal processor for processing the electrical image signals and transmitting the processed signals to a recording device; 3, a controller for controlling the entire units of camera including the image pickup unit 1 and the signal processor 2; 5, a disconnection detection switch used for detecting whether or not the recording device is properly connected; 6, a type detection switch used for detecting the kind of the connected recording device, such as a HDD or a solid state memory pack; 8, the main body of a camera (called "camera" hereinafter) having no recording device, where the camera 8 is able to designate and connect to a recording device of predetermined type and record an image. In FIG. 1, reference numeral 4a denotes a HDD which is detachable from the camera 8, and in FIG. 2, reference numeral 4b denotes a solid state memory pack which is also detachable from the camera 8.

As for a recording apparatus capable of being connected to plural kinds of recording devices as described above, there is suggested the recording apparatus which changes threshold of electrical potential, i.e., the minimum potential required for operating a recording device in accordance with a type of the recording device to be connected, such as the one disclosed in Japanese Patent Application Laid-Open No. 5-292451. The recording apparatus will be described below.

A recording apparatus capable of being connected to a HDD and a solid state memory pack will be considered. First, in order to record data in the HDD, the data to be recorded as well as electricity to drive the HDD need to be supplied from the main body of a camera. The total electrical energy which is enough to drive circuits and an actuator in the HDD has to be supplied. On the contrary, in order to record the data in the solid state memory pack, since the solid state memory pack does not include any mechanical actuator inside, the data to be recorded and electrical energy to drive only circuits in the solid state memory pack need to be supplied.

In other words, the required electrical potential (thresholds of electrical potential for required for recording operation), to be supplied from the main body of the camera to the recording device, of the two external recording device for performing normal recording, have relationship of the required electrical potential to drive the HDD (Va)>the required electrical potential to drive the solid state memory pack (Vb). More specifically, in a case where batteries in the main body of the camera discharged and the potential became low, the relationship of the electrical potential of the two external recording device and the available potential of the batteries may become, the required electrical potential to drive the HDD (Va)>the available electrical potential of the batteries>the required electrical potential to drive the solid state memory pack (Vb). In this case, the data can not be recorded in the HDD, but can be recorded in the solid state memory pack. However, if the conventional recording apparatus which has only a single threshold of electrical potential is used, the threshold of potential which is necessary to drive all kinds of recording devices to be connected (in this case, the required potential for the HDD) is stored as data, therefore, even though a solid state memory pack is actually usable, recording in any kinds of recording devices is prohibited.

On the contrary, the opportunity to record data will be broadened, if a recording apparatus capable of changing threshold, which determines a condition of recording operation, in accordance with a type of connected recording device is used, since there exists an additional status, that is, data can not be recorded in the HDD but can be recorded in the solid state memory pack.

FIG. 4 shows a flowchart of record allowance/ disallowance determination when threshold of potential, which determines a condition for recording operation, is set in accordance with a type of connected recording device. The operational sequence will be explained with reference to the flowchart.

First at step S1, whether or not recording device is properly connected is detected based on "on" or "off" information from the disconnection detection switch 5. The case where recording device is not properly connected is shown in FIG. 3. In FIG. 3, the disconnection detection switch 5 is "off", thus it is determined that the recording device is not properly connected. In this case, the recording is immediately prohibited at step S8. when the proper connection of the recording device is determined, the process proceeds to step S2.

At step S2, the kind of the connected recording device is determined based on "on" or "off" information from the type detection switch 6.

First, whether or not the connected recording device is a HDD is determined based on the "on" or "off" information from the type detection switch 6. FIG. 1 shows the camera which a HDD is connected to. In FIG. 1, the type detection switch 6 is "on" and it is determined that a HDD is connected. Then, threshold of potential, V, which is used for determining whether or not recording has to be prohibited, is set to the value, Va, for the HDD at step S4. If the connected recording device is not a HDD, then it is determined whether or not the solid state memory pack is connected at step S3. FIG. 2 is the camera which the solid state memory pack is connected to. In FIG. 2, the detection switch 6 is "off" and it is determined that the solid state memory pack is connected. Then threshold of potential, V, which is used for determining whether or not recording has to be prohibited, is set to the value, Vb, for the solid state memory pack at step S5. If the connected recording device can not be determined, then the recording operation is prohibited at step S8.

Next, potential of a generator, Vbat and the threshold of potential V are compared at step S6.

The value, Va, which is the threshold of potential V when a HDD is connected, is a minimum potential which has to be provided to the HDD in order to perform normal recording, as described above. Likewise, the value, Vb, which is the threshold of potential V in a case where a solid state memory pack is connected, is a minimum potential which has to be provided to the solid state memory pack. If "the potential of the generator, Vbat $\geq$ the threshold of potential, V", recording is prepared at step S7, whereas, when "the potential of the generator, Vbat<the threshold of potential, V", recording is prohibited at step S8. As a result, the recording operation is controlled based on the threshold of the potential corresponding to the connected recording device.

Accordingly, the condition of the potential of the generator and the type of connected recording device is taken into consideration. Thus, if the potential of the generator is not enough to drive a recording device which requires greater potential, the recording operation may not be prohibited immediately, but recording in a recording device which requires smaller potential may be performed. Therefore, a recording opportunity will not be missed in vain because the potential of the generator is low. In addition, the effective use of the potential of the generator is improved.

However, the aforesaid recording apparatus merely prohibits the recording operation depending on the threshold of the potential which corresponds to the connected recording device, and the recording device which can be used for recording is not informed to a user. In other words, unless connecting a recording device, whether or not the connected device is usable can not be determined.

Therefore, if the recording in a HDD is disallowed, for instance, the user may abandon any effort to keep picking-up images even though the recording can be continued by using a solid state memory pack. Furthermore, if the user thinks that the recording can be continued by using a solid state memory pack and connects it to the camera, there may be a case where the recording can not be continued.

In addition, if a recording apparatus capable of being connected to plural kinds of recording devices at the same time and capable of using one of them by designation is operated in the same manner as described above, and if the HDD is designated as the device to record under the condition where the recording is prohibited if the HDD is designated, and where the recording can be continued if the solid state memory pack is designated. The recording is prohibited, although a recording device which is usable is connected, and the user may miss the recording opportunity.

SUMMARY OF THE INVENTION

The present invention has been made in consideration of the above situation, and has as its object to provide an electrical apparatus capable of being connected plural kinds of peripheral devices, where a user can easily know which peripheral device is/are usable.

The foregoing object is attained by providing an electrical apparatus capable of being connected to plural kinds of peripheral devices alternatively, comprising: connecting means for connecting the plural kinds of peripheral devices alternatively; power supply means for supplying electrical power to the connected peripheral device via the connecting means; comparing means for comparing the power of the power supply means to a predetermined value; and notification means for notifying usable peripheral device or devices on the basis of a comparison result by the comparing means.

According to another aspect of present invention, the foregoing object is attained by providing an electrical apparatus capable of being connected to plural kinds of peripheral devices at the same time, comprising: connecting means for connecting to the plural kinds of peripheral devices at the same time; power supply means for supplying electrical power to the connected peripheral device via the connecting means; comparing means for comparing the power of the power supply means to a predetermined potential value; and notification means for notifying usable peripheral device or devices on the basis of a comparison result by the comparing means.

Other objects and advantages besides those discussed above shall be apparent to those skilled in the art from the description of a preferred embodiment of the invention which follows. In the description, reference is made to accompanying drawings, which from a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
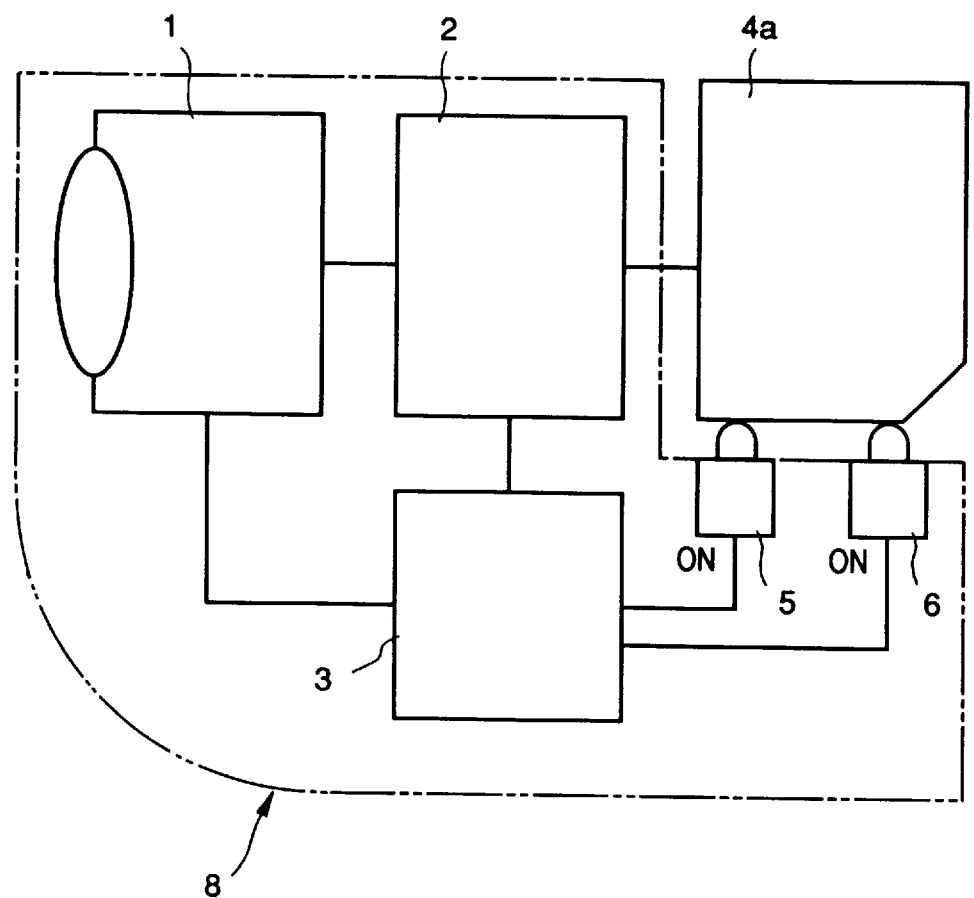
FIG. 1 is a block diagram of a conventional recording apparatus with a hard disk drive connected.
Figure 2:
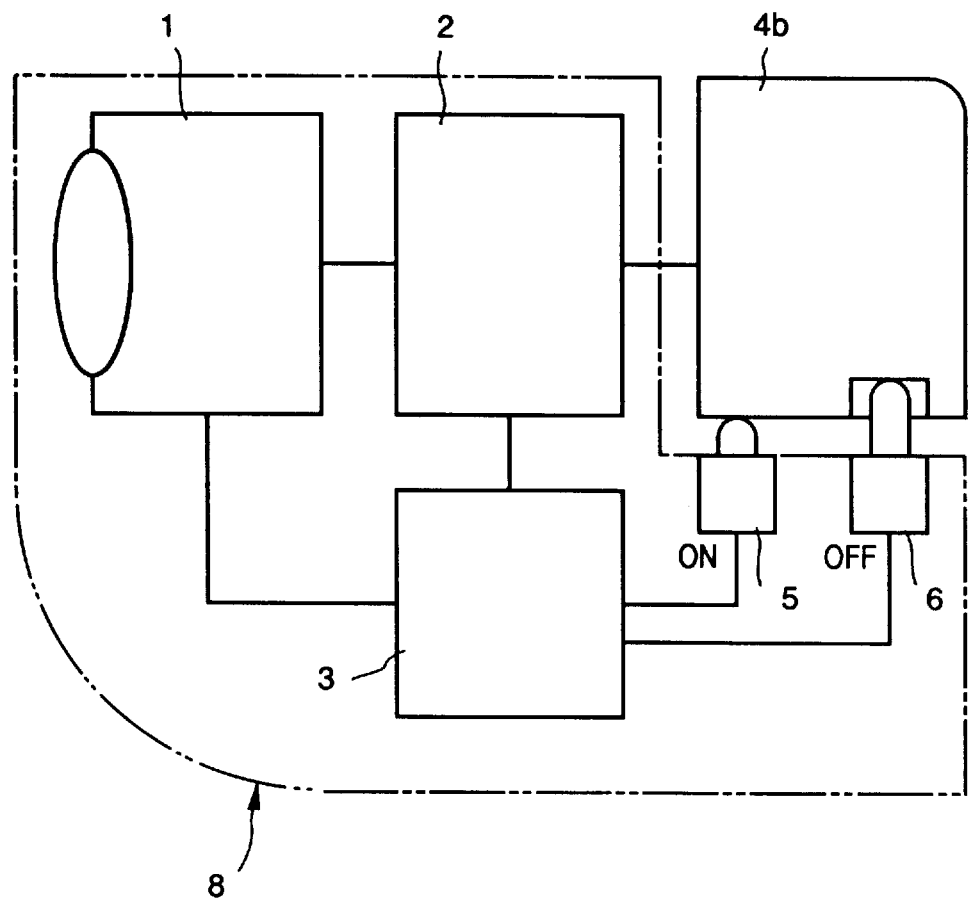
FIG. 2 is a block diagram of the conventional recording apparatus with a solid state memory pack connected.
Figure 3:
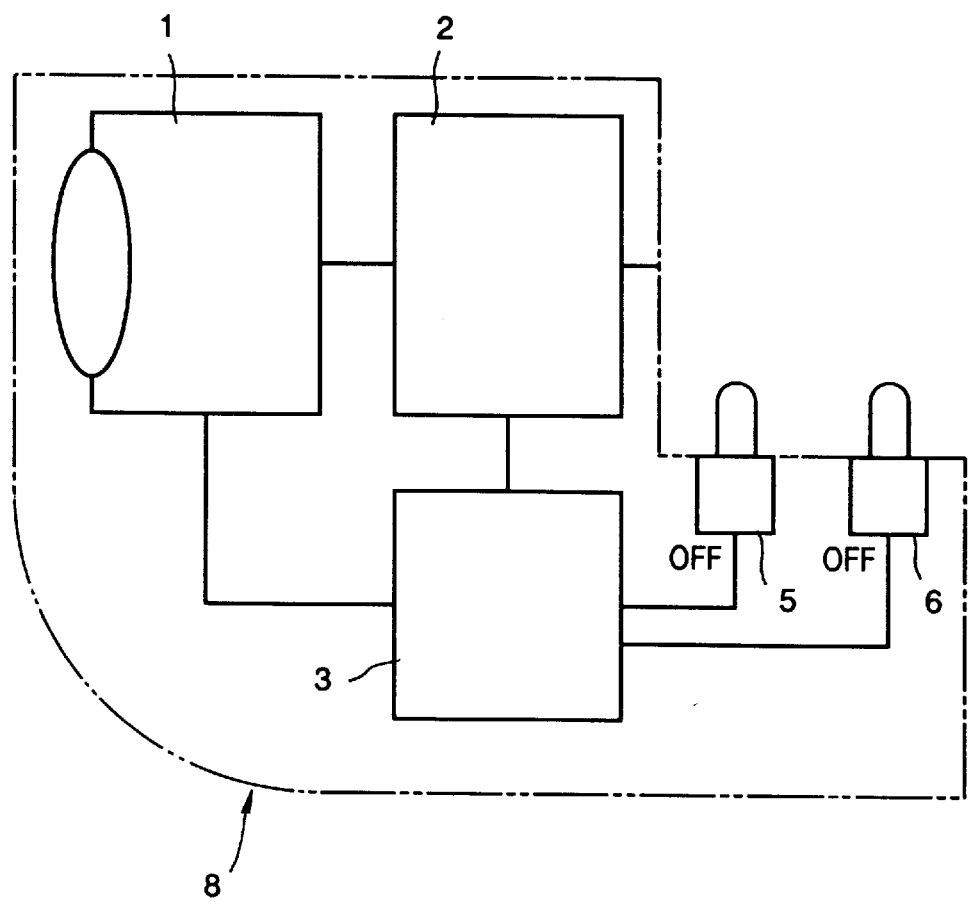
FIG. 3 is a block diagram of the conventional recording apparatus with nothing connected.
Figure 4:
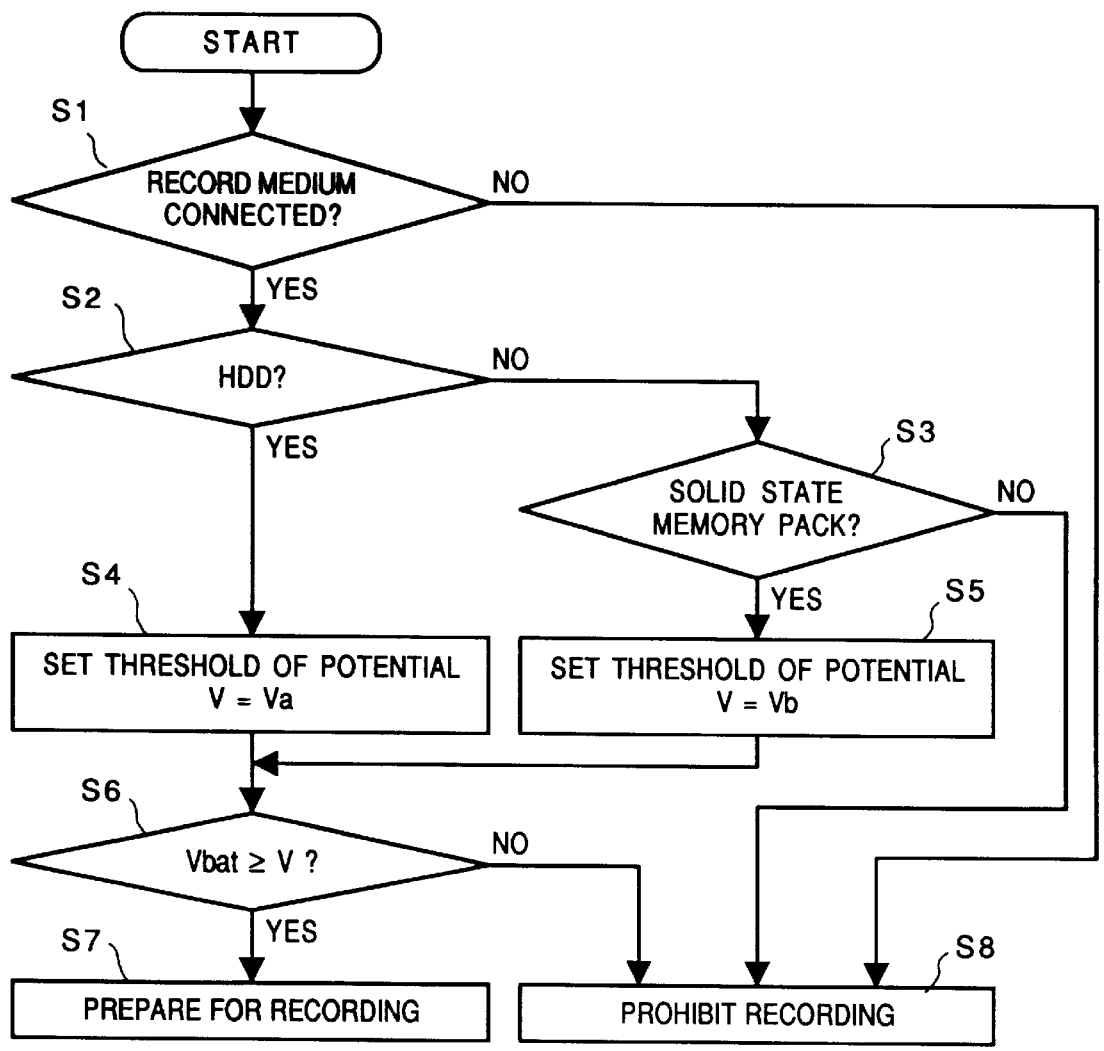
FIG. 4 is a flowchart explaining a record allowance/disallowance decision by the conventional recording apparatus.
Figure 5:
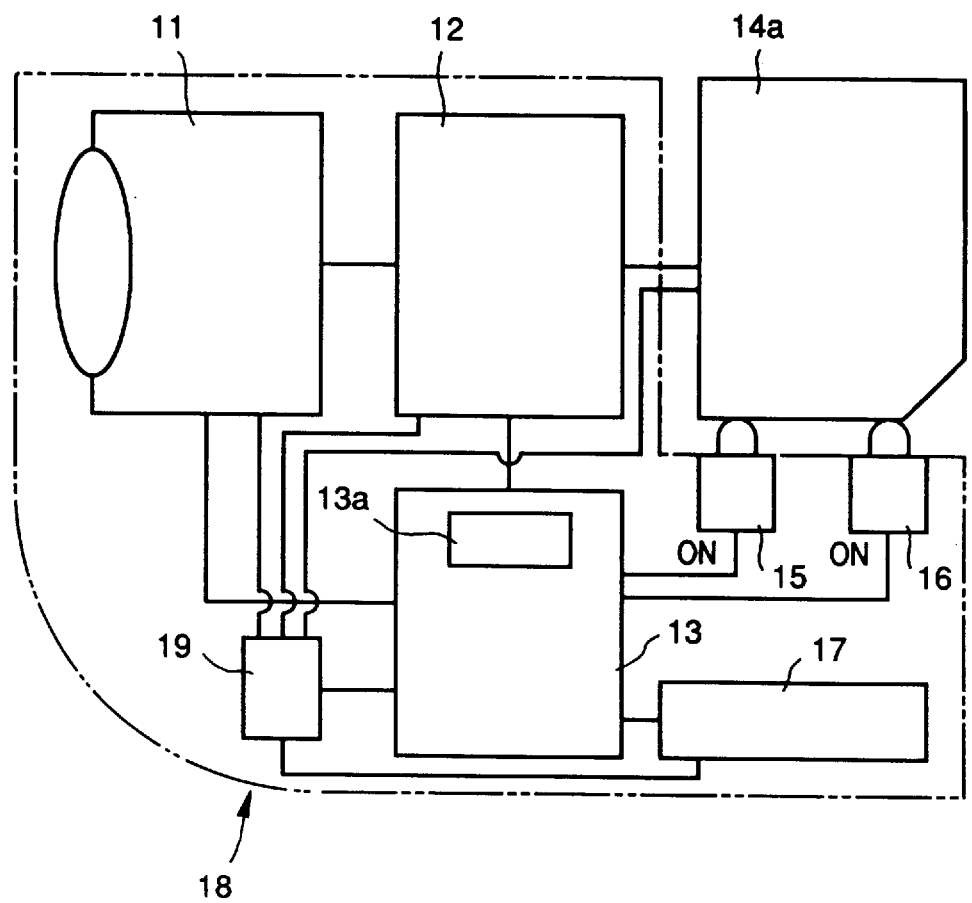
FIG. 5 is a block diagram of a recording apparatus with a hard disk drive connected according to a first embodiment.
Figure 6:
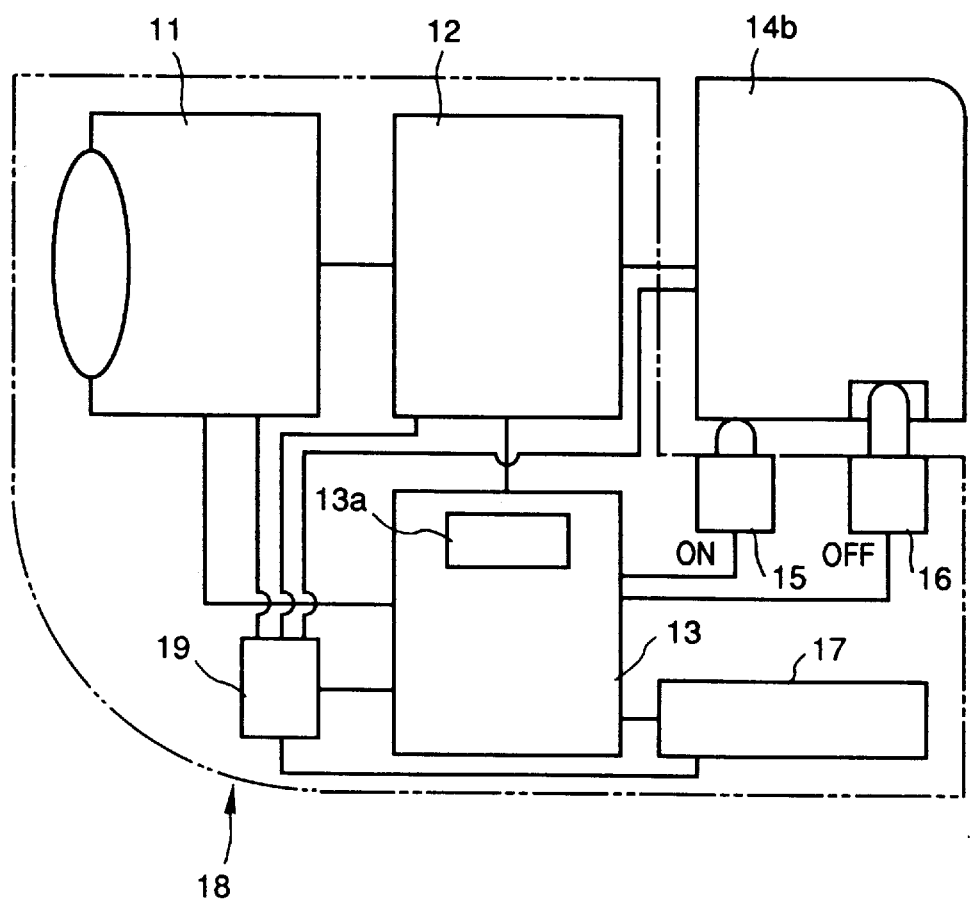
FIG. 6 is a block diagram of the recording apparatus with a solid state memory pack connected according to the first embodiment.
Figure 7:
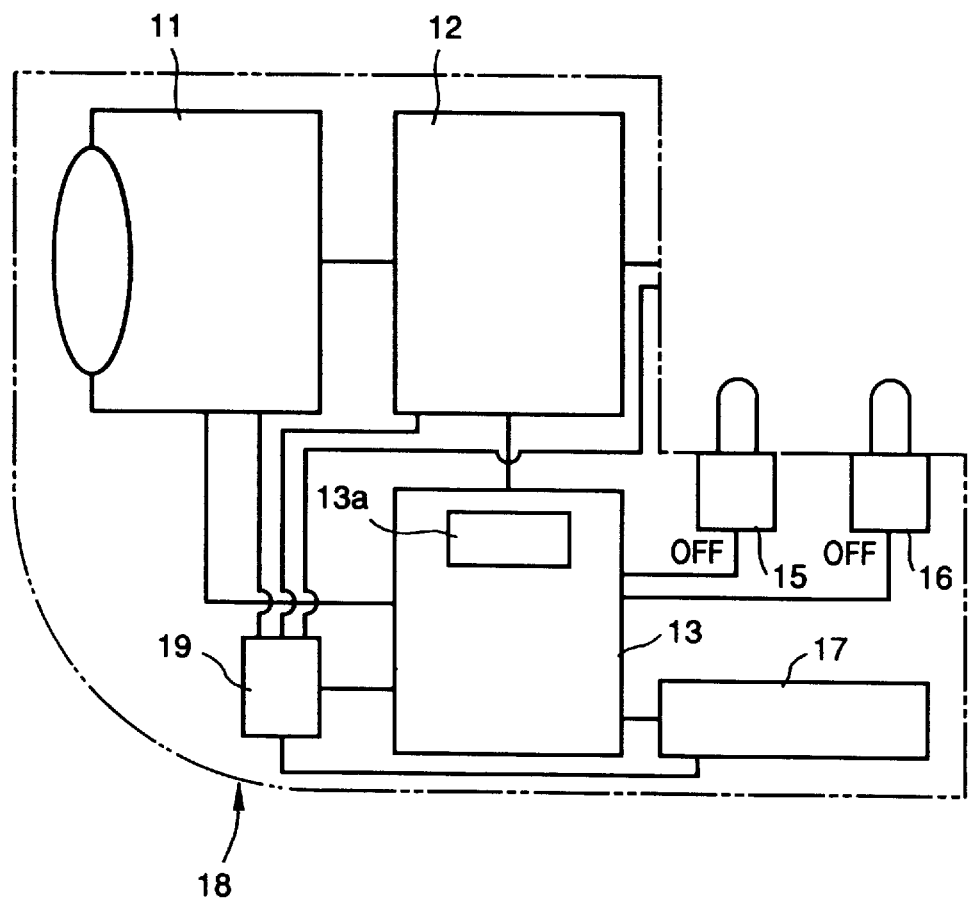
FIG. 7 is a block diagram of the recording apparatus with nothing connected according to the first embodiment.

FIG. 5 is a block diagram of a recording apparatus with a hard disk drive (HDD) connected according to a first embodiment, FIG. 6 is a block diagram of a recording apparatus with a solid state memory pack connected, and FIG. 7 is a block diagram of a recording apparatus with nothing connected.

In those figures, reference numeral 11 denotes an image pickup unit having optical elements and converting a picked-up image into electrical image signals; 12, a signal processor for processing the electrical image signals and transmitting the processed signals to a recording device, such as the HDD and the solid state memory pack, which will be described later; 13, a controller for controlling the entire units of camera including the image pickup unit and the signal processor; 15, a disconnection detection switch used for detecting whether or not the recording device is properly connected; 16, a type detection switch used for detecting a kind of connected recording device, such as HDD or solid state memory pack; 17, a notification unit for notifying a comparison result obtained by comparing potential of a generator with each threshold corresponding to each of plural kinds of recording devices; 18, a main body of a camera (called "camera" in the first embodiment) having no recording device, where the camera 18 is able to designate and connect to a recording device (HDD or a solid state memory pack) of predetermined type and record an image. In FIG. 5, reference numeral 14a denotes the HDD which is detachable from the camera 18, and in FIG. 6, reference numeral 14b denotes the solid state memory pack which is also detachable from the camera 18.

In this embodiment, minimum potential which has to be supplied from the camera 18 to each recording device differs, and the relationship is described as, the minimum voltage to be supplied to HDD (Va)>the minimum voltage to be supplied to the solid state memory pack (Vb). Further, a memory 13a is provided inside of the controller 13, and stores the values, Va and Vb.

Note that the disconnection detection switch 15 and the type detection switch 16 are illustrated as mechanical switches, however, switches which detect electrical connection state can be used.

Figure 8:
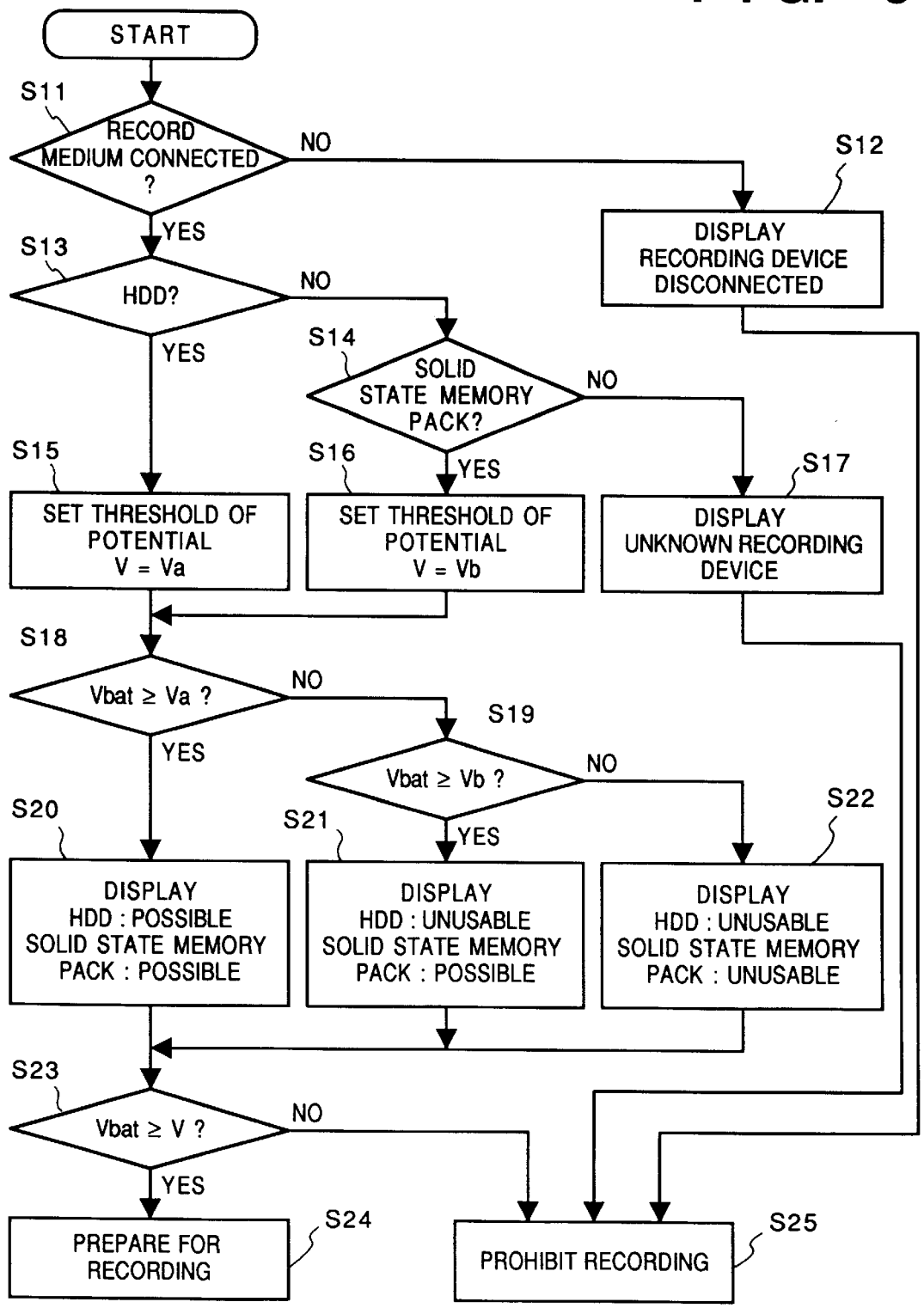
FIG. 8 is a flowchart explaining a record allowance/disallowance decision by the recording apparatus according to the first embodiment.

Next, the sequence of record allowance/disallowance decision of the first embodiment will be explained with reference to FIG. 8.

First at step S11, whether or not recording device is connected is detected based on "on" or "off" information from the disconnection detection switch 15. The case where recording device is not properly connected is shown in FIG. 7. In FIG. 7, a disconnection detection switch 15 is "off", thus the recording device is detected that it is not properly connected. In this case, the notification unit 17 displays "recording device disconnected" at step S12, and the recording operation is immediately prohibited at step S25. When the proper connection of the recording device is determined, the process proceeds to the next step.

Next at step S13, the kind of the connected recording device is determined based on "on" or "off" information from the type detection switch 16.

First, whether or not the connected recording device is the HDD is determined based on the "on" or "off" information from the type detection switch 16. FIG. 5 is the camera which the HDD is connected to. In FIG. 5, the type detection switch 16 is "on" and it is determined that the HDD 14a is connected. Then, threshold of potential, V, which is used for determining whether or not recording has to be prohibited, is set to the value, Va, for the HDD at step S15. If the connected recording device is not the HDD, then it is determined whether or not the solid state memory pack 14b is connected at step S14. FIG. 6 is the camera which the solid state memory pack is connected to. In FIG. 6, since the detection switch 16 is "off", it is determined that the solid state memory pack 14b is connected. Then threshold of electrical potential, V, which is used for determining whether or not recording should be prohibited is set to the value, Vb, for the solid state memory pack 14b at step S16.

If the connected recording device is neither the HDD 14a nor the solid state memory pack 14B, then notification unit 17 displays "unknown recording device" at step S17, and the recording operation is prohibited at step S25.

Next, a voltage of generator, Vbat, and each threshold of potential, Va and Vb, which is stored in the memory 13a in advance, are compared. Then recording device or devices usable for recording is/are determined and notified to a user.

At step S18, the potential of generator, Vbat, and the threshold of potential of the HDD, Va, are compared.

In a case where the potential of generator, Vbat≧the threshold of potential of the HDD, Va, since Va>Vb, both the HDD 14a and the solid state memory pack 14b are usable for recording. Thus, the notification unit 17 displays, "HDD: possible if installed", "Solid state memory pack: possible if installed" at step S20.

In a case where the potential of generator, Vbat<the threshold of potential of the HDD, Va, the process proceeds to a comparison step to compare the potential of generator, Vbat, with the threshold of potential of the solid state memory pack 14b, Vb, at step S19.

If the threshold of potential, Vbat≧the threshold of potential of the solid state memory pack 14b, Vb, the solid state memory pack is usable for recording although the HDD is unusable, thus the notification unit 17 displays "HDD: unusable", "Solid state memory pack: possible if installed" at step S21.

If the threshold of potential, Vbat<the threshold of potential of the solid state memory pack 14b, Vb, both the HDD and the solid state memory pack are unusable for recording, therefore, the notification unit 17 displays "HDD: unusable" "Solid state memory pack: unusable" at step S22.

The potential of generator, Vbat, is compared with the threshold of potential, V, at step S23.

When the HDD 14a is connected, the threshold of potential, V, is set to the minimum potential, Va, which is the least potential to be supplied to the HDD 14a in order to perform normal recording, as described in the conventional example. Likewise, when the solid state memory pack 14b is connected, the threshold of potential, V, is set to the minimum potential, Vb, which is the least potential to be supplied to the solid state memory pack 14b. Thus, if the potential of generator, Vbat≧the threshold of potential, V, recording operation is determined to continue at step S24, whereas if the potential of generator, Vbat≧the threshold of potential, V, recording operation is terminated at step 25.

According to the aforesaid operation, recording operation is controlled on the basis of the threshold of potential corresponding to the recording device currently connected to the camera 18, and information on recording device which are disconnected (or which recording device is available) is also notified to the user.

[Second Embodiment]

Figure 9:
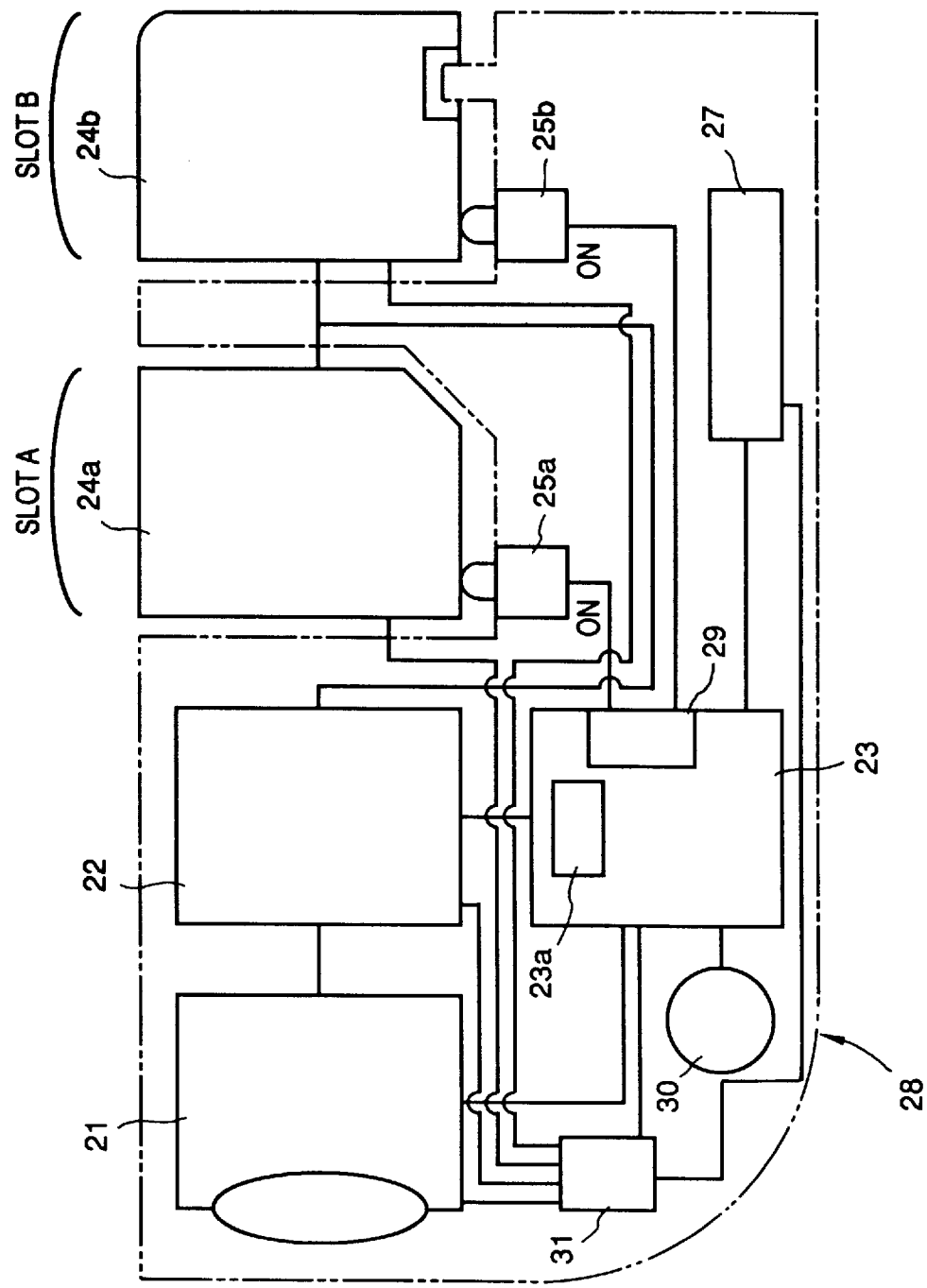
FIG. 9 is a block diagram of a recording apparatus capable of being connected with plural kinds of recording devices at the same time according to a second embodiment.

FIG. 9 is a block diagram of a recording apparatus capable of being connected to plural kinds of recording devices at the same time.

In FIG. 9, reference numeral 21 denotes an image pickup unit having optical elements and converting a picked-up image into electrical image signals; 22, a signal processor for processing the electrical image signals and transmitting the processed signals to a recording device, such as HDD and the solid state memory pack; 23, a controller for controlling the entire units of camera including the image pickup unit and the signal processor; 24a, HDD which is detachable from a main body of the camera 28; 24b, a solid state memory pack which is also detachable from the main body of the camera 28; 25a, a first disconnection detection switch used for detecting whether or not the recording device is connected; 25b, a second disconnection detection switch; 27, a notification unit for notifying a comparison result obtained by comparing potential of a generator with each threshold corresponding to each of plural kinds of recording devices; 28, the main body of a camera (called "camera" in the second embodiment) having no recording device; 29, a type determination unit for determining the type of connected recording device; 30, a designating unit for designating one of the connected recording device or devices to be used for recording; and 31, a generator, such as batteries. The camera 28 can be connected to a plurality of recording devices, and the HDD 24a is connected at a slot A, and the solid state memory pack 24b is connected at a slot B, in this embodiment.

In this embodiment, minimum potential which has to be supplied from the camera 28 to each recording device differs, and the relationship is described as, the minimum voltage to be supplied to HDD (Va)>the minimum voltage to be supplied to the solid state memory pack (Vb). Further, a memory 23a is provided inside of the controller 23, and stores the values, Va and Vb.

Note that the disconnection detection switches 25a and 25b are illustrated as mechanical switches, however, switches which detect electrical connection state can replace.

Figure 10:
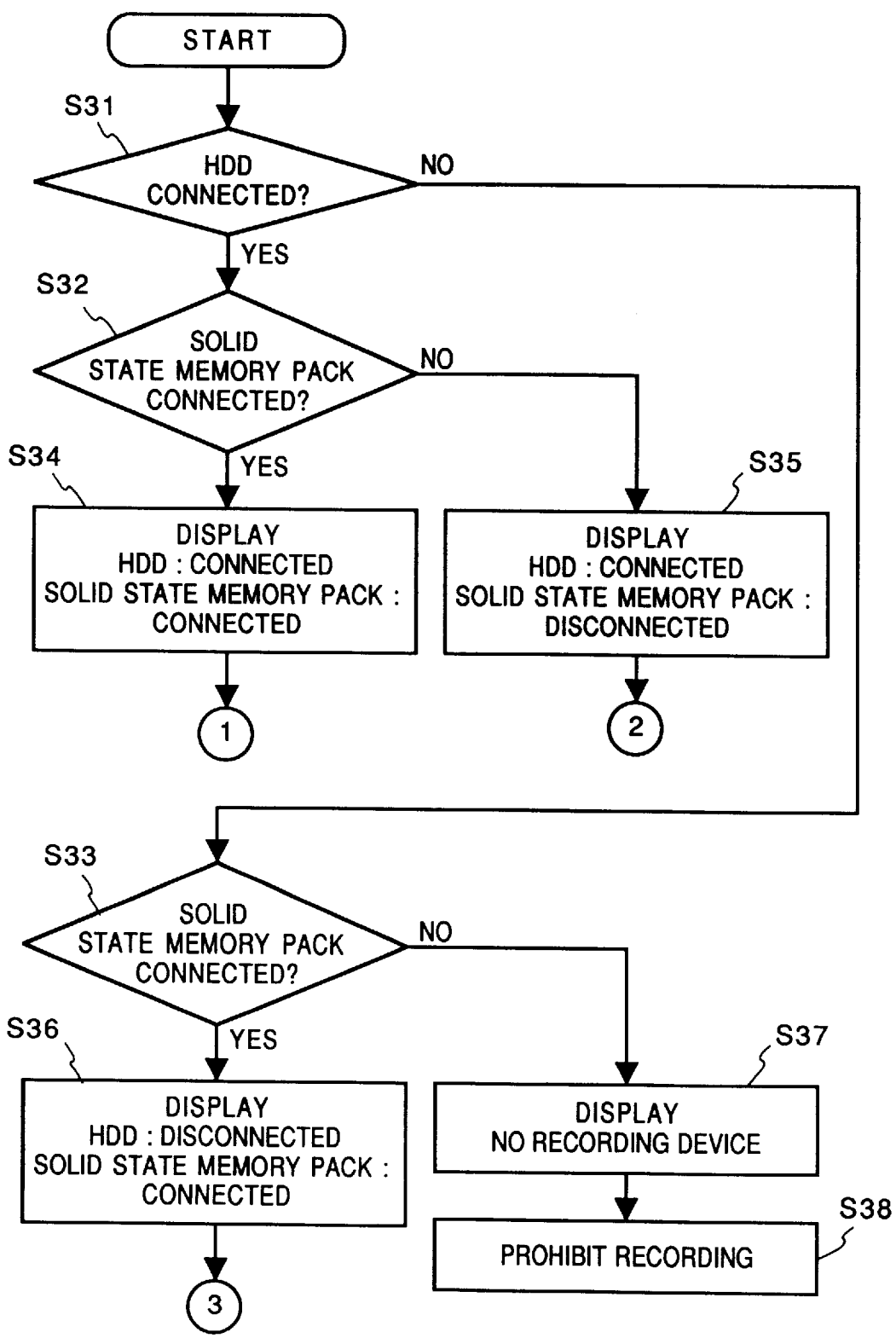
FIG. 10 is a flowchart of detecting recording device or devices connected to the recording apparatus capable of being connected with plural kinds of recording devices according to the second embodiment.

Next, sequence for determining the recording device connected to the camera 28 will be explained with reference to FIG. 10.

First at step S31, whether or not a recording device is connected at the slot A is detected based on "on" or "off" information from the first disconnection detection switch 25a. Since the HDD 24a is connected to the camera 28 at the slot A in this embodiment, whether or not the HDD 24a is connected is determined.

Next at steps S32 and S33, whether or not recording device is connected at the slot B is detected based on "on" or "off" information by the second disconnection detection switch 25b. Since the solid state memory pack 24b is connected to the camera 28 at the slot B in this embodiment, whether or not the solid state memory pack 24b is connected is determined.

The types of connected recording device are determined and recognized based on the information from the two disconnection determination switches. More specifically, (1) If both the HDD 24a and the solid state memory pack 24b are connected:
The notification unit 27 displays "HDD: connected", "Solid state memory pack: connected" at step S34. The process moves to ① in FIG. 10.

(2) If the HDD 24a is connected, but not the solid state memory pack 24b:
The notification unit 27 displays "HDD: connected", "Solid state memory pack: disconnected" at step S35. The process moves to ② in FIG. 10.

(3) If the solid state memory pack 24b is connected, but not the HDD 24a:
The notification unit 27 displays "HDD: disconnected", "Solid state memory pack: connected" at step S36. The process moves to ③ in FIG. 10.

(4) If neither the HDD 24a nor the solid state memory pack 24b is connected:
The notification unit 27 displays "no recording device" at step S37. The recording operation is prohibited at step S38.

Below is explanation of each flow of ①, ②, and ③.

Figure 12:
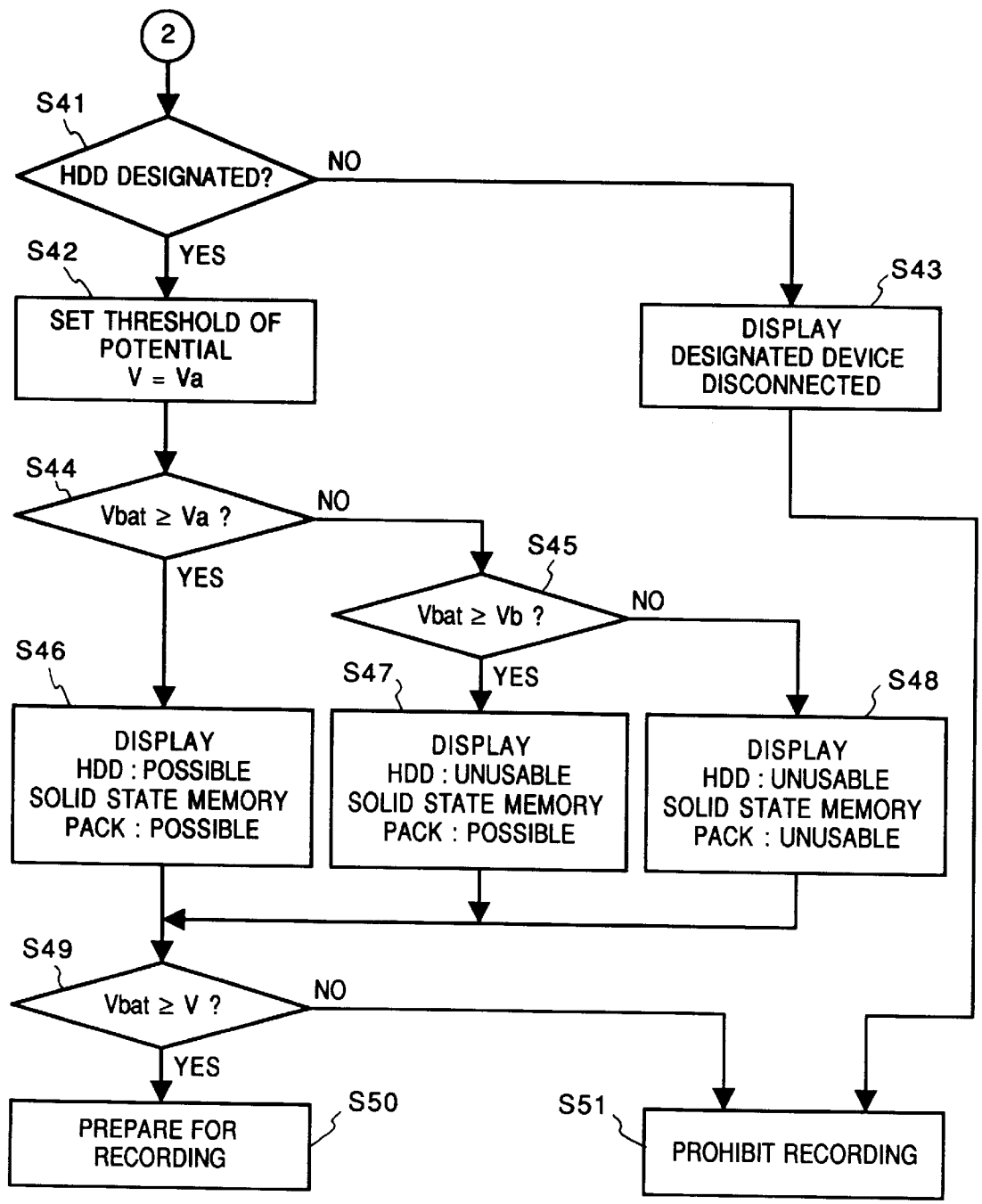
FIG. 12 is a flowchart following the flowchart of record allowance/disallowance decision of ② in FIG. 10.
Figure 13:
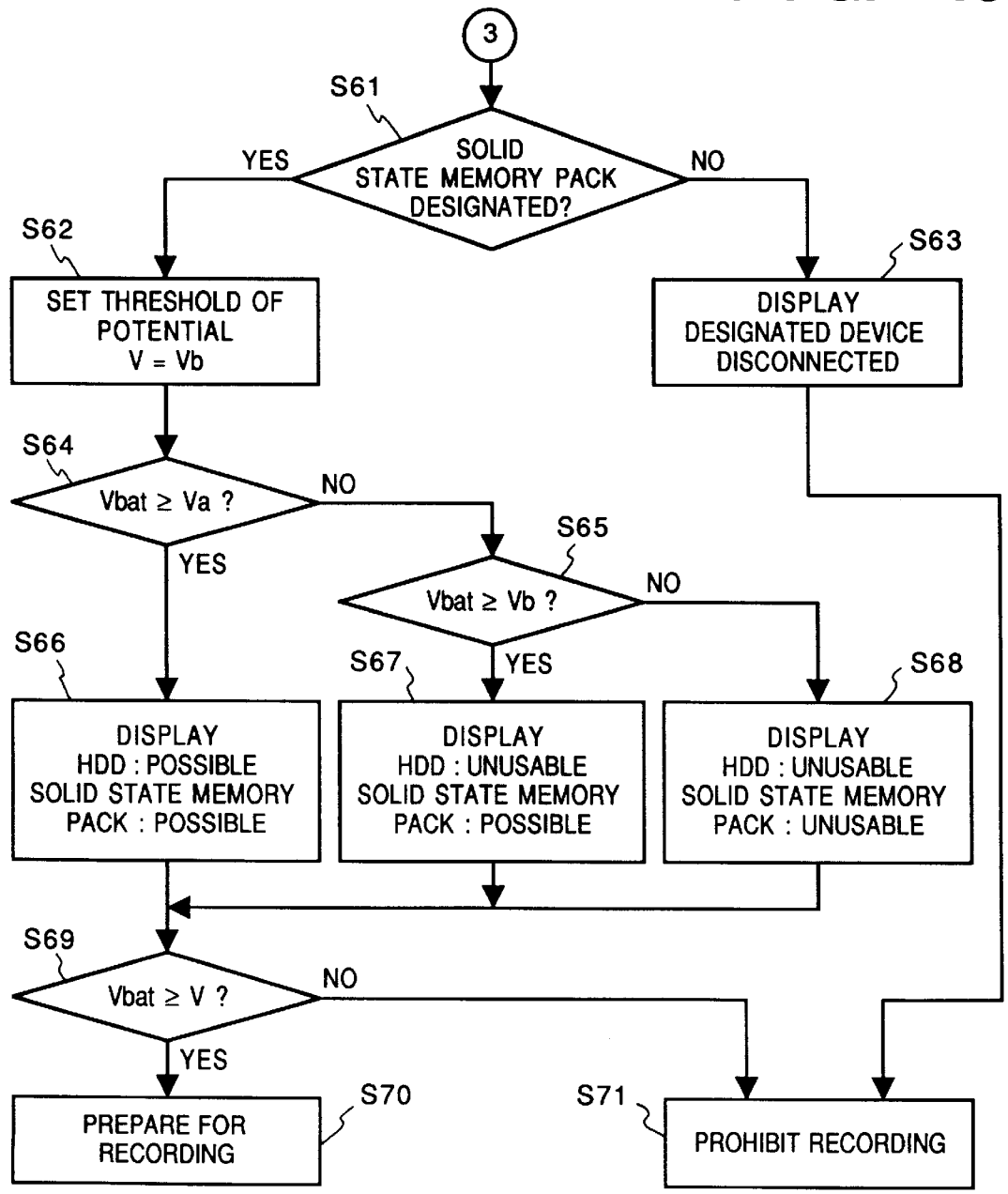
FIG. 13 is a flowchart following the flowchart of record allowance/disallowance decision of ③ in FIG. 10.

The flow ② and ③ will be explained with reference to FIGS. 12 and 13, respectively.

In the flow ②, it is detected that which recording device is designated for recording operation, and confirmed. Specifically, whether or not the designated recording device is the HDD 24a is checked at step S41. It should be noted that the designation of the recording device to be used is already performed by the designating unit 30.

If the designated recording device is not the HDD 24a, the notification unit 27 displays that "designated device disconnected", at step S43, and the recording operation is prohibited at step S51.

If the designated recording device is the HDD 24a, then the threshold of potential V, used for determining the prohibition of recording, is set to Va, corresponding to the HDD 24a at step S42. Then the potential of generator Vbat is compared to the each threshold of potential, Va and Vb, stored in the memory 23a in advance at steps S44 and S45, and the currently usable recording device or devices is/are determined at step S45 and notify it/them to a user at step S46, S47, and S48. The operation of the determination is same as described in the first embodiment. Successively, the potential of generator, Vbat, is compared to the threshold of potential, V, at step S49 and recording operation is controlled either to make the camera 28 ready for recording or to prohibit the recording operation, at steps S50 and S51, where this operation is same as the comparison at step S23 in FIG. 8 in the first embodiment.

In the flow ③, it is detected that which recording device is designated for recording at first, as in the flow ②, and confirmed. Specifically, whether or not the designated recording device is the solid state memory pack 24b is checked at step S61. If the designated recording device is not the solid state memory pack 24b, the notification unit 27 displays that "designated device disconnected", at step S63, and the recording operation is prohibited at step S71. If the designated device is the solid state memory pack 24b, then the same process as described in the flow ② is performed.

Figure 11:
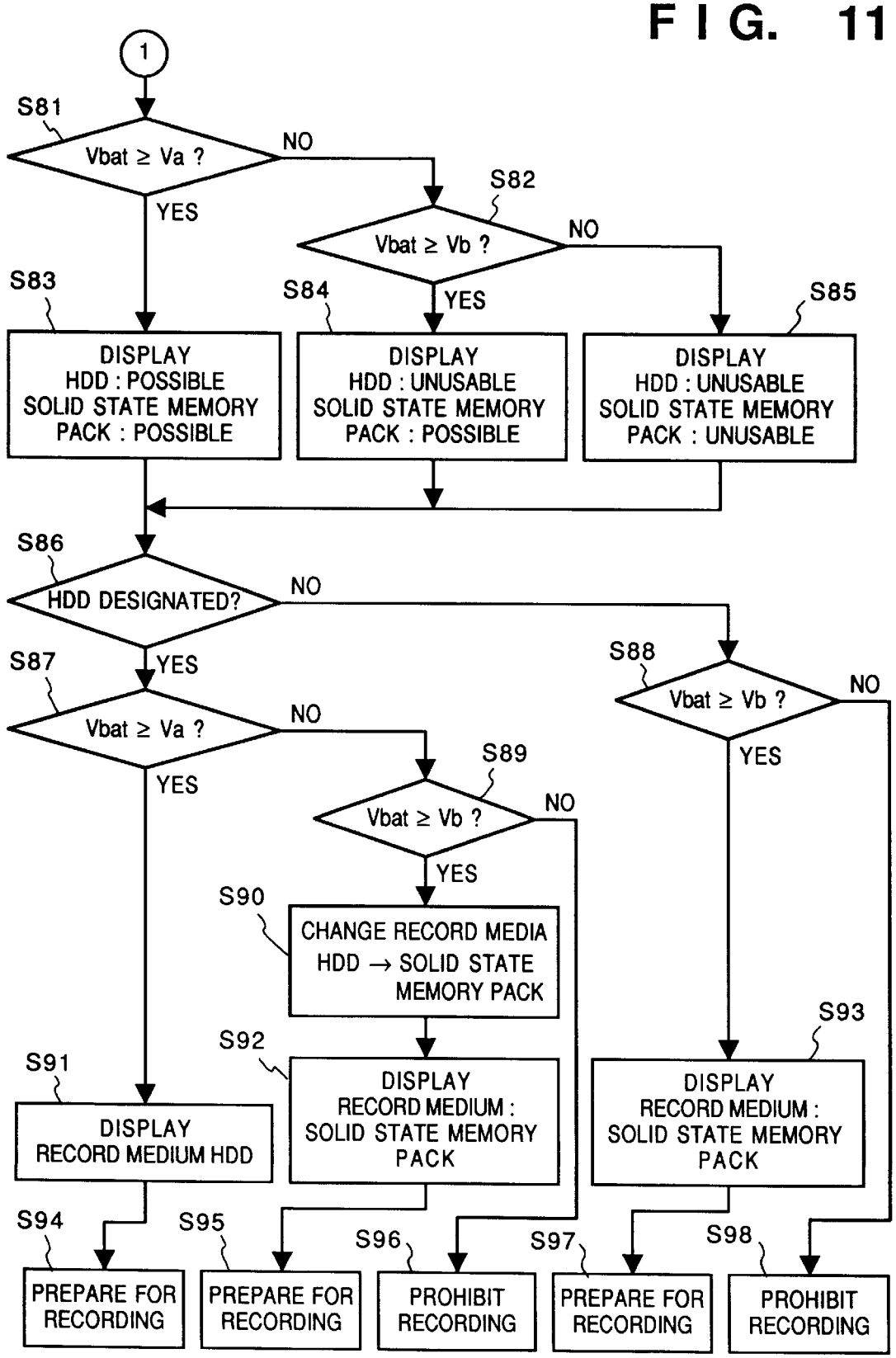
FIG. 11 is a flowchart following the flowchart of record allowance/disallowance decision of ① in FIG. 10.

The flow ① will be described with reference to FIG. 11.

In the flow ①, the potential of generator Vbat is compared to the threshold of potential of each recording device, Va and Vb, at first, then the recording device available for recording is determined and notified during steps S81 to S85.

Then the designated recording device is checked at step S86. At this time, whether or not the designated recording device is the HDD 24a is checked. In this embodiment, since the connected recording device is the HDD 24a and the solid state memory pack 24b, if the HDD 24a is determined that it is not designated, then the solid state memory pack 24b is determined to be designated. Further, the recording device to be used is assumed that it is already designated by the designating unit 30, as in the flows ② and ③.

The control of the recording device is shown below.

(1) The solid state memory pack 24b is designated:
The potential of generator Vbat is compared to the threshold of potential of the solid state memory pack 24b, Vb, at step S88, and if the potential of generator Vbat<the threshold of potential of the solid state memory pack, Vb, then recording is prohibited at step S98.

If the potential of generator Vbat≧the threshold of potential of the solid state memory pack 24b Vb, then the notification unit 27 displays that "Recording device: Solid state memory pack" at step S93, then the recording apparatus is controlled to prepare for recording at step S97. This display of the recording device to be used is for confirming the recording device to be used, because two types of recording device are connected.

(2) The HDD 24a is designated:

The potential of generator, Vbat, is compared to the threshold of potential of the HDD pack 24a, Va, at step S87, and if the potential of generator Vbat≧the threshold of potential of the HDD 24a Va, then the notification unit 27 displays that "Recording device: HDD" at step S91, then the recording apparatus is controlled to prepare for recording at step S94. This display of the recording device to be used is for confirming the recording device to be used, because two types of recording device are connected.

Finally, if the potential of generator, Vbat<the threshold of the HDD, Va, the potential of generator, Vbat and the threshold of the solid state memory pack, Vb, are compared at step S89.

This is because, although the HDD is designated to be used, if "HDD: unusable" and "Solid state memory pack: possible if installed", then the recording is continued in the solid state memory pack 24b, by giving priority to the recording opportunity over the designation of the recording device. More specifically, if the potential of generator, Vbat<the threshold of the solid state memory pack, Vb, then the recording operation is prohibited at step S96. Whereas, if the potential of generator, Vbat≧the threshold of the solid state memory pack, Vb, then the recording device to be used is changed from the designated HDD 24a to the solid state memory pack 24b at step S90. Then the notification unit 27 displays that "recording device: Solid state memory pack" at step S92, then the recording device is controlled to ready for the recording at step S95. This display is to show that the recording device to be used is changed from the designated recording device, HDD 24a, to the solid state memory pack 24b.

According to the above-mentioned operation, in a case where the recording device having high threshold of potential (e.g., HDD) is unusable for recording but where the recording device having low threshold of potential (e.g., solid state memory pack) is usable, the conventional problem that a user may miss a recording opportunity because camera 8 prohibits the recording operation even though the available recording device is connected, is solved.

Further, the comparison between the potential of generator, Vbat, and thresholds of potential are performed at two different steps in this embodiment, however, a result of determining usable recording device can be stored after the first comparison instead of performing the comparison for determining if the designated recording device is usable or not.

Further, image information is recorded in this embodiment, however the present invention is not limited to this, and not only image information but also any kinds of information can be applied to the present invention.

It should be noted that the present invention can be applied to a system constituted by a plurality of devices, or to an apparatus comprising a single device. Furthermore, the invention is applicable also to a case where the object of the invention is attained by supplying a program to a system or apparatus.

According to the embodiments as described above, there can be provided an easily operable recording apparatus which provides information not only on the currently connected recording device but also on all the recording device to be connected by providing the notification unit for notifying the recording device usable for recording on the basis of the comparison result obtained by comparing the potential of generator and the minimum potential required to operate each kind of recording device. Especially, in a case where only a specific recording device is usable for recording, the difficulty and time required the program to find the proper recording device for replacing recording device is saved, thereby the possibility to miss the recording opportunity would be reduced.

Further, there can be provided an easily operable recording device capable of connecting to plural kinds of recording devices at the same time, which gives priority to the recording opportunity over the designation of the recording device by recording in the currently usable recording device although the device is not designated, on the basis of the comparison result obtained by comparing the potential of generator and the minimum potential necessary to operate each recording device. Further, by displaying the recording device which is used for recording, the device where an image is recorded will not be lost, and it is readily known, and it will help to edit the recording later.

The present invention is not limited to the above embodiments and various changes and modifications can be made within the various changes and modifications can be made within the spirit and scope of the present invention. Therefore, to apprise the public of the scope of the present invention the following claims are made.

What is claimed is:

1. An electrical apparatus capable of being connected to plural kinds of peripheral devices alternatively, comprising:
    connecting means for connecting the plural kinds of peripheral devices alternatively;
    power supply means for supplying electrical power to the connected peripheral device via said connecting means;
    comparing means for comparing the power of said power supply means to a predetermined value; and
    notification means for notifying a user which peripheral device or devices is/are usable for the given power supply conditions on the basis of a comparison result by said comparing means before said peripheral device is connected to the apparatus.

2. The electrical apparatus according to claim 1, further comprising memory means for storing a plurality of minimum power values each of which is necessary for operating each of the plurality of peripheral devices.

3. The electrical apparatus according to claim 1, further comprising disconnection detection means for detecting whether or not one of the plural kinds of peripheral devices is connected via said connecting means, wherein said notification means is also able to notify whether or not the peripheral device is connected via said connecting means on the basis of a detected result by said disconnection detection means.

4. The electrical apparatus according to claim 1, further comprising type determination means for determining a type of the peripheral device connected via said connecting means out of the plural kinds of peripheral devices, wherein said notification means is also able to notify the type of the peripheral device connected via said connecting means.

5. The electrical apparatus according to claim 1, further comprising determination means for determining which peripheral device or devices is/are usable or unusable, and display means for displaying a determined result by said determination means.

6. The electrical apparatus according to claim 5, further comprising control means for controlling so as to record predetermined information in a recording device connected via the connecting means, when the connected peripheral device is determined to be usable.

7. An electrical apparatus capable of being connected to plural kinds of peripheral devices at the same time, comprising:

connecting means for connecting to the plural kinds of peripheral devices at the same time;

power supply means for supplying electrical power to the connected peripheral device via said connecting means;

comparing means for comparing the power of said power supply means to a predetermined value; and notification means for notifying a user which peripheral device or devices is/are usable for the given power supply conditions on the basis of a comparison result by said comparing means before starting a driving operation of said peripheral device.

8. The electrical apparatus according to claim 7, further comprising memory means for storing a plurality of minimum power values each of which is necessary for operating each of the plurality of peripheral devices.

9. The electrical apparatus according to claim 7, further comprising type determination means for determining which peripheral device or devices is/are connected and which peripheral device or devices is/are disconnected via said connecting means out of the plural kinds of peripheral devices, wherein said notification means notifies which peripheral device or devices is/are connected and which peripheral device or devices is/are disconnected via said connecting means on the basis of a determined result by said type determination means.

10. The electrical apparatus according to claim 7, further comprising determination means for determining which peripheral device or devices is/are usable or unusable, and display means for displaying a determined result by said determination means.

11. The electrical apparatus according to claim 10, further comprising designation means for designating one of the plural kinds of peripheral devices connected via said connecting means, and control means for controlling so as to record predetermined information in the designated peripheral device connected via the connecting means, when the designated peripheral device is determined to be usable.

12. The electrical apparatus according to claim 11, wherein said control means automatically selects other usable peripheral device when the peripheral device designated by said designation means is determined to be unusable, and controls so as to record predetermined information in the selected peripheral device.

13. The electrical apparatus according to claim 12, wherein said display means displays the usable peripheral device selected by said control means instead of the designated peripheral device.

* * * * *